United States Patent Office 3,422,950
Patented Jan. 21, 1969

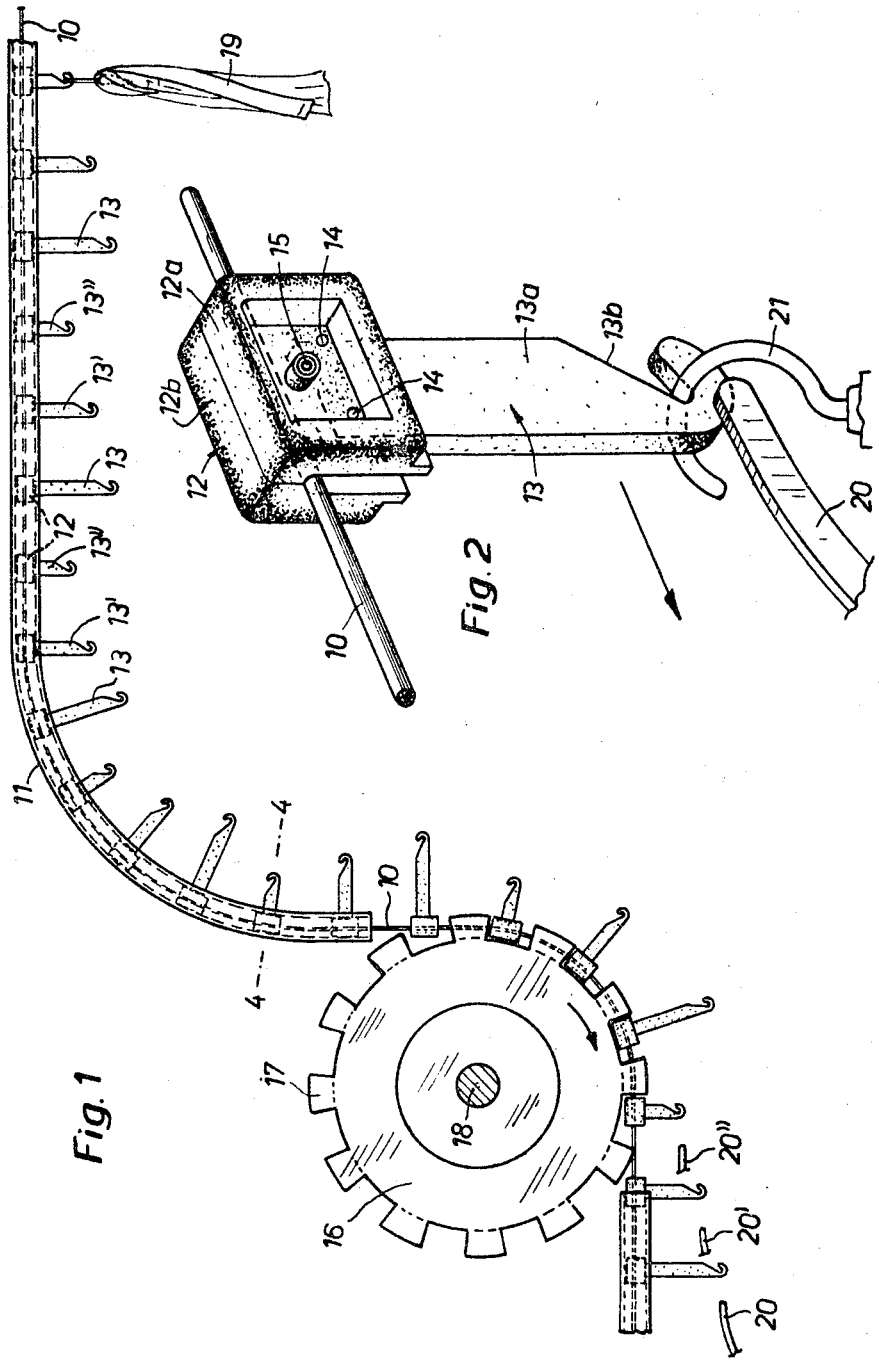

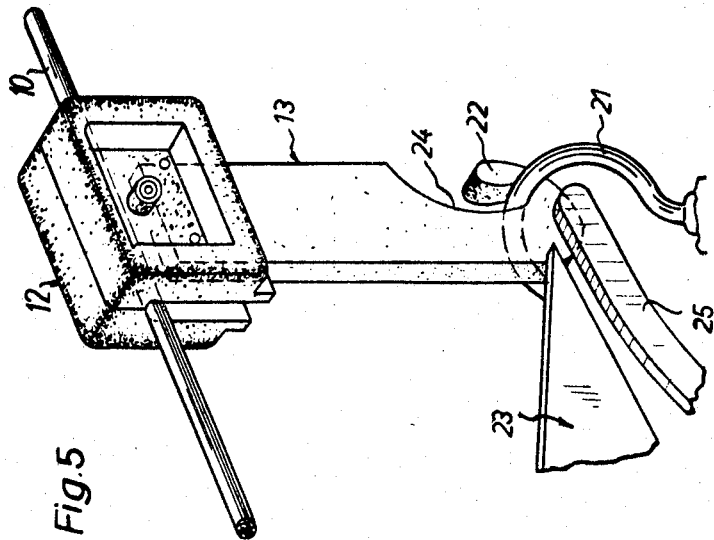
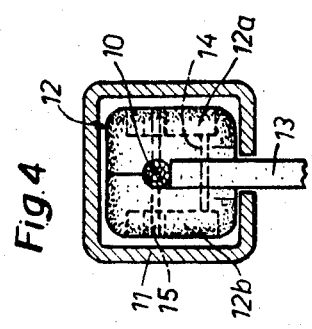
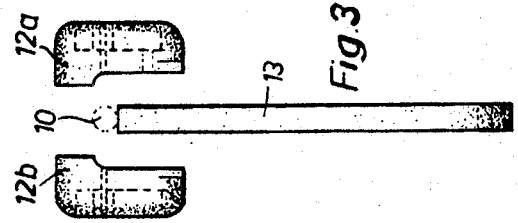

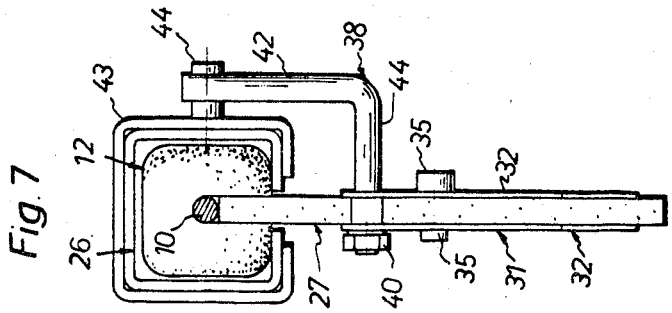
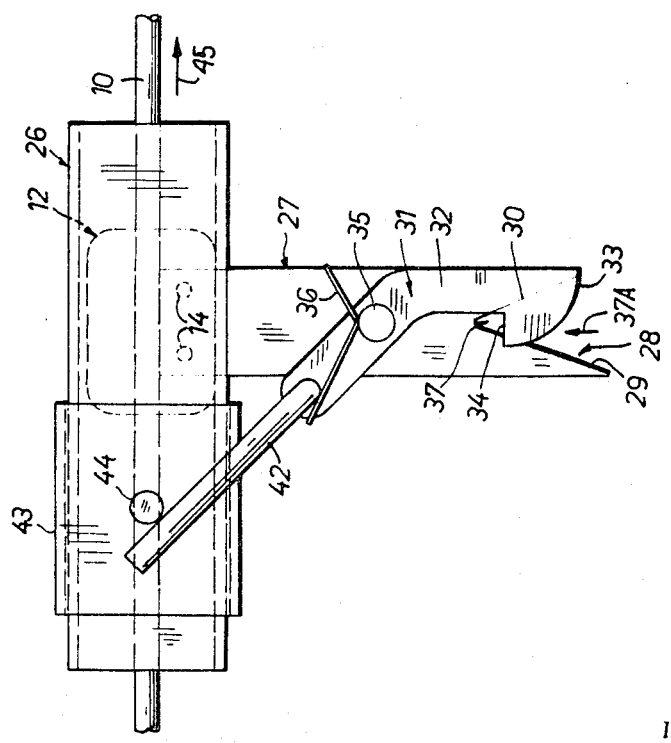

3,422,950
CONVEYOR
Heinrich Bachmann, Kusnacht, Zurich, Switzerland, assignor to Terlinden & Co., Kusnacht, Zurich, Switzerland
Filed Aug. 29, 1966, Ser. No. 575,699
Claims priority, application Switzerland, Sept. 15, 1965, 12,788/65
U.S. Cl. 198—177                     2 Claims
Int. Cl. B65g 17/20

ABSTRACT OF THE DISCLOSURE

An endless conveyor includes traction means defining a closed path, driving means for the traction means, slides anchored to the traction means at spaced intervals therealong, a hollow rail extending through a major portion of the closed path and having a longitudinal slot along a bottom wall, the traction means extending longitudinally through the rail and the slides being slidable within the rail, article carrying means each secured to a respective slide and extending through the slot, and at least one separating means disposed along the path and selectively cooperable with an article carrying means to remove a transported article from the latter during advance of the carrying means along the path.

The slides and the article carrying means are formed of material having a low coefficient of friction, and preferably of synthetic plastic material with a dry lubricating filler, for example a polyamide synthetic plastic with a filler of nylon to which molybdenum disulphide has been added.

The article carrying means are arranged for ready cooperation with the separating means and, in one embodiment, comprise a scissors or tongs type holder including a pivoted arm swingable to open the article carrying means when the pivoted arm engages a separating means.

Background of the invention

The present invention relates to an endless conveyor for transporting articles by means of spaced carrying members connected to a flexible pulling means.

A conveyor for use indoors and intended to serve a series of operations must combine the greatest possible reliability with the lowest possible cost. Thus, a suitable conveyor should require little or no maintenance, should be affected as little as possible by its own operation, and at the same time should be simply and inexpensively installed or broken down for removal to another location. Moreover, the conveyor should transport articles, but not otherwise affect them, such as to damage, ruin, or dirty them. The conveyor should not require an excessive amount of driving power and should give rise to the fewest possible side effects, for example, it should not develop noisiness. The conveyor should require only a modest amount of room. Further, the endless conveyor should be capable of operating not only in a single horizontal or vertical plane but in number of spaced planes, so that it can cover the work space of several floors.

Conveyors of the prior art do not completely meet these conditions. Thus, those having hangers running on overhead trolley-conveyor-rails possess the disadvantage that the rollers running along the rails, the means pulling the hangers, and the rail rolling surfaces are exposed to the atmosphere, which is sometimes corrosive. Moreover, a conveyor of this kind requires a not negligible amount of maintenance, which implies a certain danger for the conveyed articles, which, for example, can become dirtied through the use of too much lubricant.

A conveyor in which a holding member, acting as a carrying and transporting member, is suspended from a conveyor chain does partially fulfill the need for little maintenance; but the chain, as in the previous example, remains exposed to the environment and for a given size is limited in its load-carrying ability.

If the chain is located within a rail it can carry heavier loads, but it now requires either more maintenance or better lubrication, which latter always gives rise to the possibility of the conveyed articles becoming oily. The development of noisiness is also a problem. Further, placing the chain in a rail, for example, requires that considerably more power be used to drive the conveyor.

The invention will now be described with reference to the drawings, wherein:

FIGURE 1 is a diagrammatic side view of a portion of a conveyor installation;

FIGURE 2 is an enlarged perspective view of a slider with holding means and cable;

FIGURE 3 is a front view of a slide and article carrier disassembled;

FIGURE 4 is a view in cross section taken along line 4—4 of FIGURE 1;

FIGURE 5 is a perspective view of another form of the holding means with a cooperating take-off wedge;

FIGURE 6 is a side elevation view of another embodiment of article carrier in accordance with the invention, and a cooperating separating means; and FIGURE 7 is an end elevation view, looking from the left of FIG. 6.

The following forms of the invention are suitable for a conveyor in a dry cleaning and other plants where it is desired to separate articles from a conveyor at different points along the conveyor path.

Referring to FIGURE 1, the conveyor of the invention has a cable 10 serving as the pulling or traction means and which forms the endless closed path. Along major stretches of the conveyor path the cable passes through a rail 11 closed on all sides except for a longitudinal opening in its bottom, FIGURE 4. A series of sliders 12, regularly spaced and anchored to the cable, move along the inside of the rail 11. The sliders can be made as a single unitary body or, as shown (FIGURES 2, 3) as two halves 12a, 12b. The cable 10 and carrying means (shown as hooks) 13, 13′, 13″ are secured between the halves by pins 15 and 14, respectively, or other suitable means. To prevent shifting of the sliders 12 along the cable, sleeves (not shown) of brass, for example, can be brazed or welded onto the cable contiguous to the front of the sliders, whereby the sleeves, acting as stops, prevent the guides from sliding.

As shown at FIGURES 1 and 4, the guides sufficiently occupy the cross sectional area of the rail to ensure, on the one hand, that they are well controlled in the rail 11 and, on the other hand, that they move easily and without jamming.

The conveyor is driven by a toothed wheel turning in the direction of the arrow and powered by conventional means, not shown, rotating the shaft 18. The teeth 17 of the wheel are shaped and spaced so that they occupy the space between two adjacent sliders 12, the forward face of the tooth pushing upon the rear face of a slider. To permit acceptance of the cable, each tooth 17 can be provided with a circumferential slot or otherwise two separate axially spaced toothed wheels can be connected to the shaft 18.

As apparent from FIGURES 1 and 2, the hooks 13–13″ comprise a hook 13b proper and a depending stem 13a. The stems of the hooks 13–13″ are each of a different length. The purpose of this is to permit the selective removal, in dependence on the length of the stem, of articles, in this case wearing apparel 19, hung from the hooks. To this end, a pick-off finger 20, 20′, 20″ for each of the different stem lengths is provided at the place where the articles are to be taken off the hooks. For the sake of simplicity, the three pick-off fingers are shown next to one another, although they could each be located at widely separated points along the conveyer path.

The fingers can be moved into and out of their operative position by conventional means, not shown. Movement to an inoperative position can be to one or the other side of the conveyor or downward, or a combined lateral and downward movement. In its operative position, a finger engages the hangers 21 of the hooks 13 of selected length and raises the hanger up the lower inclined surface of the jaw as the hook continues to advance. The hanger is thus freed of the hook and supported solely by the finger 20. The finger can be made as the upper termination of a slide that conveys the hangers and the apparel hung thereon to a work station in a dry cleaning plant. The hangers removed from the hooks by the finger move down the slide to the station. If it should occur that the station, say a presser, is not in operation, the finger for that presser is moved to its inoperative position and the articles for pressing transported to the next presser.

Obviously, as many fingers for a hook of given length can be provided as desired. A finger can also be designed to remove hangers from hooks of more than one length.

As shown particularly well at FIG. 2, each hook 13b has a V-shaped jaw open to the rear. The line bisecting the angle defined by the jaw mouth makes an approximately 45° angle with the longitudinal axis of the stem 13a. The shape of the jaw mouth ensures a safe transport of objects carried along the path section located just before the wheel 16, where the conveyor falls abruptly. Moreover, the shape of the jaw facilitates removal by the fingers 20–20″ of objects carried, whether they be garments on clothes hangers 21 or other objects carried by a suspension lug or eye. It is to be noted that it is only for reasons of space that a portion of the conveyor is shown as falling vertically. It will be understood that maximum slope of the conveyor will depend on the spacing of the hooks 13–13″, on their lengths, and on the lengths of the articles conveyed.

The hooks 13b proper can also be designed as rings. In this case the conveyed objects must be supported by hooks which are inserted and removed from only one side of the rings. The hooks for carrying the objects must be so designed as to permit a selective removal from the rings.

The material for the guides 12 and the carrying means 13–13″ is advantageously resistant to corrosion and wear and has a low coefficient of friction. A polyamide synthetic plastic with a dry lubricating filler of nylon, for example, to which molybdenum disulphide has been added has given particularly satisfactory results. This material ensures that the guides and carrying means will have a nearly absolute resistance to corrosion and wear. The material, furthermore, offers the known advantages of low specific gravity, quiet operation, and easy workability. It can be injection molded, for example. The material does not particularly require lubricaton of sliding parts, so that the entire conveyor can operate virtually "dry." This is particularly advantageous in applications where the presence of excess lubricant can endanger the objects transported.

To further increase the corrosion resistance of the installation, the cable 10 can be covered with a flexible, corrosion-resistant coating of a polyethylene, for example. Similarly, the rail 11 can be given a corrosion-resistant coating.

The thickness of the carrying means and of the guides will be chosen in dependence on the weight of the objects transported and the severity of operation. Although in the described example each guide has a carrying means, it is also possible for every other or third guide, for example, to have a carrying means.

The design of the carrying means 13–13″ will depend upon the nature of the articles transported. The invention is not limited to the specific embodiment disclosed. Similarly, the design and dimensions of the rail 11 in cross section may be varied as required. For example, in certain applications it will be useful to design the guides 12 with a prolongation extending through the longitudinal opening in the rail and to which prolongation the carrying means is pivotally connected.

The pulling means 10 also can be designed as a bar chain, the slide means 12 being pivotally connected to ends of the bars.

In a further form of the invention, FIGURE 5, the hooks 13 terminate in a portion 22 bent somewhat back upon itself, preventing removal of a hanger 21 over the hook. The design assures that a hanger cannot accidentally become disengaged. To remove a hanger, a pick-off wedge 23, movable between operative and inoperative positions by conventional means (not shown), is located in its operative position to intercept the hangers. As the hook 13 advances the wedge engages the hanger 21, which, because of the portion 22, is constrained to rise up the surface 24 until it is located above the end of portion 22. The hook end passes underneath the changer, which now slides down the wedge onto a finger 25, which, as previously explained in connection with the finger 20, may form part of a slide down which the hangers move to a work station. It will be understood that each finger 25 is accompanied by a wedge 23. In this embodiment the fingers 25 are stationary and located so that they cannot remove a hanger from a hook. If a particular station is down, the wedge for that station is moved to its inoperative position.

In a further form of the invention, FIGURES 6 and 7, the sliders 12 (only one shown), anchored to the cable 10, slide in a rail 26, similar to the rail 11. Dependent from each slider 12 is a member 27 anchored to the slider by pins 14 and terminating in an inverted V 28 one side 29 of which is longer than the other side 30. A fork 31, of which each element 32 has at its lower end a generally circular edge 33 and a horizontal edge 34, is rigidly mounted on a pin 35 that pivots in a hole in the member 27. The spacing between the two similar elements 32 of the fork is sufficient to ensure that the fork pivots easily with respect to the member 27. A spring 36 biases the fork in a clockwise direction, whereby to maintain closed the V 29. The upper ends of the sides 29, 30 and the edges of the elements 32 cooperate to form an aperture 37. The fork 31 and member 27 thus form a carrier, which can be loaded with a clothes hanger, for example, by thrusting the hanger in the direction of the arrow 37A against the edge 33, causing the fork to pivot counterclockwise, against the spring bias, until the hook of the hanger is located in the aperture 37, whereupon the fork, biased by the spring 36, automatically snaps shut, imprisoning the hook of the hanger in the aperture. It will be noted that when the fork is pivoted counterclockwise an approximately vertical path is opened to the aperture.

The upper end of the fork is provided with an arm 38, rigidly secured to the fork in any suitable manner, as by a sleeve and nut 40, and having an outwardly projecting horizontal portion 41 and a rearwardly and upwardly extending portion 42 bent at right angles to the portion 41. Spaced at suitable intervals along the rail 26 are sleeves 43 (only one shown), secured to the rail in any suitable manner, and having an outwardly projecting horizontal pin 44, located at a height to ensure that the portion 42 strikes the pin 44.

The embodiment functions in the following manner. The carrier, comprised of the fork 31 and the member 27, is loaded as previously described. The cable 10 moves in the direction of the arrow 45, pulling along the slides 12. A sleeve 43 is located at those positions along the rail 26 where it is desired to unload a carrier. As the slider 12 is pulled past the sleeve, the arm portion 42 strikes the pin 44, which, because the arm 38 is rigid with the fork 31, causes the fork to pivot counterclockwise, opening the aperture 37 and freeing the hanger hook from the carrier.

It will be appreciated that the arm 38 can consist of a horizontal length only and that the pins 44 downwardly bent to engage the arm.

If desired, the sleeves 43 can be eliminated and the pins 44 fixed directly to a side of the rail 26.

To ensure that only given carriers are unloaded at a given position along the rail 26, some of the pins 44 can be located on the opposite side of the sleeve 43 or rail 26. Thus, an arm 38 would be located on the one side or on the other side of the fork 31, to cooperate with the pins 44 associated with the one side or the other side of the sleeve or rail.

The pins 44, which are spaced along the length of the rail, can be located at different heights along the side of the rail 26 or sleeve 43, each higher pin being longer than the next lower pin. The arms, in turn, are of the same general design as the arm 38, but the portions 41 and 42 are of such length to ensure that a given arm cooperates with only a pin at a given height. Alternatively, the design of the pins and arms can be reversed: that is, the arms consist simply of a horizontal portion of different lengths and each pin consists of a horizontal and downwardly extending portions of such lengths so as to ensure that a given pin cooperates only with an arm of a given length, whereby the aperture of the carrier is opened at the desired position along the rail, for example, at a work station of a dry cleaning plant. In a further form of the invention, the pins 44 are located on members located at intervals alongside the path of the rail and project into the path of the arms 38.

The fork 31, member 27, arm 38, sleeve 43, and pins 35 and 44 can be made of any suitable material, such as a metal or a synthetic plastic.

I claim:

1. In an endless conveyor of the type including traction means defining a closed path, driving means driving the traction means, a plurality of slides anchored to the traction means at spaced intervals therealong, a hollow rail extending through at least a portion of the closed path and having a longitudinal slot along a bottom wall thereof, the traction means extending longitudinally through the hollow rail and the slides being slidable in the hollow rail, article carrying means each secured to a respective slide and extending through the rail slot, and at least one separating means disposed along the path and selectively cooperable with an article carrying means to remove a transported article from the latter during advance of the article carrying means along the path: the improvement in which said slides are formed of a synthetic resin material containing a dry lubricating filler; each article carrying means comprising a substantially flat and relatively elongated arm extending perpendicularly from the associated slide and having a V-shaped notch opening through its free end; and a two-leg lever pivoted, intermediate its ends, to said arm; one leg of said lever being formed, adjacent its free end, with a hook portion including a normally horizontal edge arranged to extend across said notch near the apex thereof to close said notch; the other leg of said lever extending adjacent said rail; and means biasing said lever to the notch closing position; said other leg of said lever being cooperable with a separating means to swing said lever, against the force of said biasing means, in a direction to open said notch for release of an article from said notch.

2. In an endless conveyor, the improvement claimed in claim 1, in which said lever is a forked lever with one leg of the fork lying adjacent each side surface of said arm; said other leg of said lever having a rod rigidly secured thereto and projecting therefrom for cooperation with a separating means.

References Cited

UNITED STATES PATENTS

| 3,055,480 | 9/1962 | Hyman | 198—38 |
| 3,118,531 | 1/1964 | Rutkovsky et al. | 198—177 X |
| 3,151,730 | 10/1964 | Bunten | 198—38 |
| 3,051,096 | 8/1962 | Walsh et al. | 198—213 X |
| 3,148,765 | 9/1964 | Weiss et al. | 198—213 |

FOREIGN PATENTS

| 1,131,860 | 10/1956 | France. |
| 1,135,092 | 12/1956 | France. |

EVON C. BLUNK, *Primary Examiner.*

R. J. HICKEY, *Assistant Examiner.*